(12) United States Patent
Karppi et al.

(10) Patent No.: US 11,932,707 B2
(45) Date of Patent: Mar. 19, 2024

(54) METHOD FOR DISSOLVING STARCH

(71) Applicant: KEMIRA OYJ, Helsinki (FI)

(72) Inventors: Asko Karppi, Espoo (FI); Perttu Heiska, Espoo (FI); Mika Suvanto, Espoo (FI); Matti Hietaniemi, Espoo (FI)

(73) Assignee: Kemira Oyj, Helsinki (FI)

( * ) Notice: Subject to any disclaimer, the term of this patent is extended or adjusted under 35 U.S.C. 154(b) by 307 days.

(21) Appl. No.: 17/429,143

(22) PCT Filed: Feb. 6, 2020

(86) PCT No.: PCT/FI2020/050071
§ 371 (c)(1),
(2) Date: Aug. 6, 2021

(87) PCT Pub. No.: WO2020/161392
PCT Pub. Date: Aug. 13, 2020

(65) Prior Publication Data
US 2023/0159666 A1  May 25, 2023

(30) Foreign Application Priority Data
Feb. 8, 2019 (FI) ...................................... 20195090

(51) Int. Cl.
| | | |
|---|---|---|
| *C08B 30/02* | (2006.01) | |
| *B01F 23/50* | (2022.01) | |
| *B01F 23/53* | (2022.01) | |
| *B01F 25/51* | (2022.01) | |
| *C08B 30/14* | (2006.01) | |
| *D21H 17/28* | (2006.01) | |
| *B01F 101/47* | (2022.01) | |

(52) U.S. Cl.
CPC ............ *C08B 30/02* (2013.01); *B01F 23/511* (2022.01); *B01F 23/53* (2022.01); *B01F 23/581* (2022.01); *B01F 25/51* (2022.01); *C08B 30/14* (2013.01); *D21H 17/28* (2013.01); *B01F 2101/47* (2022.01); *B01F 2215/044* (2013.01); *B01F 2215/0472* (2013.01); *B01F 2215/0477* (2013.01); *B01F 2215/0481* (2013.01)

(58) Field of Classification Search
CPC ......... C08B 30/02; C08B 30/14; B01F 25/51; B01F 23/581; B01F 23/53; B01F 23/511; D21H 17/28
USPC .......................................................... 162/175
See application file for complete search history.

(56) References Cited

U.S. PATENT DOCUMENTS

| | | |
|---|---|---|
| 2009/0005552 A1 | 1/2009 | Hassan et al. |
| 2010/0159104 A1 | 6/2010 | Bastien et al. |
| 2011/0300394 A1 | 12/2011 | Welsch et al. |
| 2015/0197890 A1 | 7/2015 | Laakso et al. |
| 2016/0046819 A1* | 2/2016 | Welsch .................. C12P 19/14 |
| | | 524/53 |

FOREIGN PATENT DOCUMENTS

| | | |
|---|---|---|
| CN | 101405302 A | 4/2009 |
| CN | 101589563 A | 12/2015 |
| WO | 2011/077170 A1 | 6/2011 |
| WO | 2013/140046 A1 | 9/2013 |
| WO | 2014/167051 A1 | 10/2014 |

OTHER PUBLICATIONS

Search Report of counterpart Chinese application No. 202080013107.3, search completed Jul. 4, 2022.
International Search Report and Written Opinion dated May 26, 2020 in PCT/FI2020/050071 (11 pages).
Ji, Zhili et al., "Effect of pressure with shear stress on gelatinization of starches with different amylose/amylopectin rations", Food Hydrocolloids 72 (2017) pp. 331-337.

* cited by examiner

*Primary Examiner* — Mark Halpern
(74) *Attorney, Agent, or Firm* — Meunier Carlin & Curfman LLC

(57) ABSTRACT

The present invention relates to a method and an arrangement for dissolving starch. Specifically, the present invention relates to a method for dissolving starch by introducing mechanical force to at least partially gelatinized aqueous starch.

20 Claims, 4 Drawing Sheets

METHOD FOR DISSOLVING STARCH

CROSS-REFERENCE TO RELATED APPLICATIONS

This is a U.S. national application of the international application number PCT/FI2020/050071 filed on Feb. 6, 2020, and claiming priority of FI 20195090 filed on Feb. 8, 2019, the contents of both of which are incorporated herein by reference.

FIELD OF INVENTION

The present invention relates to a method and an arrangement for dissolving starch.

BACKGROUND

Starch is a well-known additive in papermaking, and one of the oldest dry-strength agents still in use. Starch is typically used in the wet end of the paper machine, where it may be added to the papermaking fibre stock at various places before the headbox for improving paper dry strength, for controlling dusting and linting, or for retention and drainage. Other common applications of starch in papermaking include use in surface sizing compositions, or as binders in coating colour compositions. Starches are also used in different barrier applications.

Typical commercial starches used in paper making are dry powders, which must be dissolved in water before use in the application. Dry starches are typically dissolved by cooking process at the site of application just before use. When dry starch starts to dissolve in water, individual starch molecules detach from each other, which can be observed as decrease in viscosity. Starches are most typically dissolved by jet-cooking process, in which aqueous starch slurry is contacted with steam and dissolving takes place in a tube.

Typical temperature in jet-cooking process is about 120-130° C. sometimes up to 140° C. Process time is about 1-2 minutes. Undegraded starches are typically cooked at concentration of maximum 4-6 wt.-%. Temperatures of 140° C. and above are avoided as starch start to get significantly thermally degraded due to hydrolysis of glycosidic bonds. Starches may also be dissolved by cooking at atmospheric pressure, which typically involves heating to above 90° C. and maintaining the temperature for about 25 min. Here, the starch concentration is typically lower than in jet-cooking, often about 1 wt.-%. After the starch has been dissolved, it is common to dilute it below 1% solids content before dosing into the papermaking fibre stock to ensure homogeneous mixing with the fibre stock.

While starch products in dry powder form have relatively good shelf-life, once the dry starch has been dissolved in water, it should be used soon. This is because in aqueous environments starch is vulnerable to microbial spoilage, which cannot be fully addressed by adding biocides, as the remaining microbial enzyme activity may continue degrading the starch even after killing the microorganisms. Storing the dissolved starch at decreased temperature is not a satisfactory solution either due to viscosity instability. Aqueous compositions of dissolved starch are prone to retrogradation, especially at lower temperatures. During retrogradation dissolved starch gets reorganized, the starch molecules reform into new crystalline complexes and the water bound to the starch is released. In aqueous compositions having low starch content, retrogradation may be seen as an increase in turbidity or formation of precipitates that may sediment to the bottom of the container. At higher starch contents, retrogradation may even cause the aqueous compositions to gel and solidify. As can be understood, the increase in turbidity, precipitation, and gelling are not desired. While slight increase in turbidity or precipitates do not always render the composition completely unusable, its efficiency may be reduced and higher dosages needed. Additionally, there are applications where even small amounts of precipitates may block equipment or compromise critical end-product properties. Solidification on the other hand has detrimental effect both on performance and handleability/pumpability of the compositions. Starch retrogradation may be observed and analysed by various methods known in the field.

WO 2013/140046 discloses a method for dissolving high cationic starch in a poly-electrolyte solution by heating and/or mixing.

Therefore, a simple and easy method for properly dissolving starches is needed in order to enable their use in industrial scale applications. There is also a demand to develop starches which are robust against retrogradation without chemical modifications of the structure.

SUMMARY

The present disclosure generally relates to methods of dissolving starch for use in the field of paper and board manufacturing and arrangements usable in such method.

The first aspect of the present invention is a method for dissolving starch. According to the invention said method comprises the steps of:
  a) providing a feed (Feed-1) of an aqueous starch slurry having a temperature at least 5° C., preferably at least 10° C. below gelatinization temperature (on-set) of the starch; and
  b) bringing said feed (Feed-1) together with an aqueous feed (Feed-2) having a temperature of at least 60° C. to form a mixed feed (Feed-3); and
  c) subjecting said mixed feed (Feed-3) to dispergation to adjust the viscosity of said mixed feed (Feed-3).

The second aspect of the present invention is an arrangement for dissolving starch. According to the invention said arrangement comprises
  conduit (8) for feeding an aqueous starch slurry (Feed-1) to conduit (10) for a mixed feed; and
  conduit (9) for feeding an aqueous feed having an elevated temperature (Feed-2) to conduit (10);
  conduit (10) (fora mixed feed) for connecting conduits (8) and conduit (9) and high shear dispergator (11), and
  high shear dispergator (11) for adjusting the viscosity of the gelatinized starch; and
  conduit (13) for circulating the dispersed feed back to the dispergator (11) or dissolution tank (20) or recovering the dispersed starch feed.

The described embodiments and advantages apply both to the method and the arrangement described here even if not always explicitly stated so.

DETAILED DESCRIPTION

Figure 1:
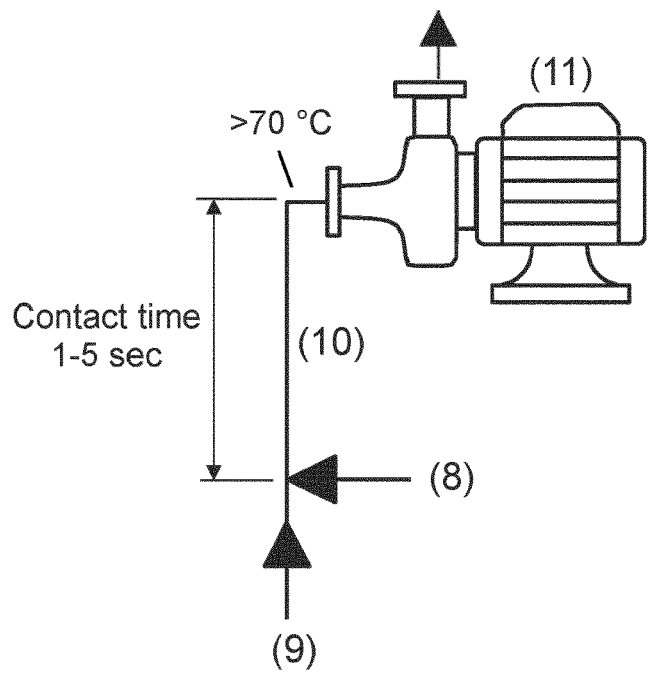
FIG. 1 is a schematic representation of the invention showing the principle of the invention

It has now surprisingly been found that when a starch slurry is gradually brought together with an aqueous flow having an elevated temperature to gelatinise the starch and then subjected to mechanical forces, such as dispergation, the resulting mixture is homogenous and has viscosity typically below 20 000 mPas (millipascal-seconds) measured at 25° C. using Brookfield LV-DV1 viscometer (equipped with a small sample adapter, and using spindle 31 and maximum rotation speed allowed by the equipment) allowing easy handing and pumping also with relatively high starch dry matter content. The resulting gelatinized starch is homogenous and may be transferred by using existing pumping equipment and pipelines, without danger of jamming or clogging. It also has an improved resistance towards retrogradation.

The present invention relates to a method for dissolving starch. The method comprises the steps of:
a) providing a feed (Feed-1) of an aqueous starch slurry having a temperature at least 5° C., preferably at least 10° C. below a gelatinization temperature (on-set) of the starch; and
b) bringing said feed (Feed-1) together with an aqueous feed (Feed-2) having a temperature of at least 60° C. to form a mixed feed (Feed-3); and
c) subjecting said mixed feed (Feed-3) to a dispergation to adjust the viscosity of said mixed feed (Feed-3).

The present invention also relates to a method for dissolving starch. The method comprises the steps of:
a) providing a feed (Feed-1) of an aqueous starch slurry having a temperature below 45° C., preferably below 40° C.; and
b) bringing said feed (Feed-1) together with an aqueous feed (Feed-2) having a temperature of at least 60° C. to form a mixed feed (Feed-3); and
c) subjecting said mixed feed (Feed-3) to a dispergation to adjust the viscosity of said mixed feed (Feed-3).

The gelatinization temperature here refers to a temperature of gelatinisation measured using differential scanning calorimetry (DSC) as discussed in Ji et al. 2017, Food hydrocolloids 72; 331-337.

In this connection expression "adjust the viscosity" includes both increasing and reducing the viscosity. The viscosity may increase while swelled starch particles are completely dissolved. However, main aim of the dispergation is reduce the viscosity and thereby enhance handling and pumpability of the composition and also allow further enriching the composition by introducing starch.

The dispergation in the present method and arrangement is attained using a high shear dispergator or other mixing device able to introduce sufficient mechanical force. Operation of high shear dispergators is characterized by high circumferential speed, high shear rate and high energy dissipation. Unlike agitation-type low shear mixers that are commonly used for blending materials without essentially reducing particle size, high shear dispergators are capable of subjecting the material being processed to high shear forces, and are widely used in energy intensive processes such as homogenization, dispersion, emulsification and grinding. Various high energy dispergators known in the field may be used in the present method and arrangement. The high shear dispergator may be for example a rotor-stator dispergator such as a colloid mill, or Cavitron or Supraton dispergator; a rotor-rotor dispergator such as Atrex dispergator; a friction grinder such as Masuko supermasscolloider; a homogenizer; or a fluidizer such as micro-fluidizer, macrofluidizer or fluidizer-type homogenizer or any type of milling device such as bead mill. In some devices the mechanical energy to the starch is transferred using specific media, such as beads in the bead mill. Preferably the high shear dispergator is a rotor-stator dispergator or a rotor-rotor dispergator. The high shear dispergator may have a power out-put 5 to 150 kWh for 1 ton of mixed feed to be treated.

In step b) Feed-1 and Feed-2 are brought together to form a mixed feed, after that the feed led to a dispergator through conduits to allow controlled contact volumes of said feeds and effective heat transfer. This may be performed by controlling flow rates and bilateral assembly of the conduits. Also a static mixing element or a dynamic mixer may be used. Starch granules in the mixed feed (feed-3) are gelatinised at least partially due to an elevated temperature. Thus, the conduit for Feed-3 can be called a gelatinization zone. Within said zone the viscosity of the mixed feed increases sharply before the feed reaches the dispergation step.

In one embodiment the mixed feed (Feed-3) entering to the dispergation step is partially gelatinized. In one embodiment the mixed feed (Feed-3) entering to the dispergation step is partially dissolved.

An aqueous feed, Feed-2 may be liquid, water or steam. Feed-2 may be pressurized. It may also contain additives which are not sensitive to heat. It may also be an aqueous solution of starch, which may be circulated back to the dispergation step, optionally after a heated dissolution tank or heating by for example heat exchanger. In another embodiment feed-2 may be hot water.

Starch in an aqueous starch slurry may contain any type of starch. It may be slurried (mixed) in granular or powder form or dispersed to an aqueous solution. In one embodiment an aqueous starch slurry containing starch having a weight average particle size 1 to 100 μm, typically 2 to 30 μm. Source of starch has an effect on natural granule size, amylopectin content and e.g. gelatinization properties.

In one embodiment the temperature of starch slurry (item a) is less than 45° C. In one embodiment a feed (Feed-1) of an aqueous starch slurry having a temperature below 35° C. or even below 30° C. is provided (item a) and brought together with an aqueous feed (Feed-2) having an elevated temperature (item b).

In one embodiment the starch is non-degraded starch. In this connection expression "non-degraded starch" means that the starch molecules have not been intentionally degraded by chemical reactions (acid hydrolysis or oxidation), enzymatic hydrolysis or thermal degradation. The method here described is suitable also for non-degraded high molecular weight starch which is difficult to dissolve and is advantageous in certain paper and board applications.

In one embodiment the aqueous composition of dissolved of non-degraded starch (dissolved as described here) comprises at least 12 wt.-% of starch dry weight. It is to be understood that dispergation and dissolution will cause some mechanical degradation of the starch in the composition. In one embodiment the composition comprises 12 to 30 weight-% of the dissolved cationic starch. In one embodiment the aqueous starch composition of starch comprises at least 12 wt.-%, 14 wt.-%, 16 wt.-% or 18 wt.-% of starch by dry weight. In one embodiment the aqueous starch composition comprises less than 30 wt.-%, 28 wt.-%, 26 wt.-%, 24 wt.-% or 22 wt.-% of starch by dry weight. In one embodiment the aqueous starch composition comprises 20 to 24 wt.-% or 20 to 22 wt.-% of starch by dry weight. A high content of dry matter is beneficial in transportation and storage. Using a mechanical dispergation it may be difficult to dissolve granular starch in low concentrations. The aqueous starch composition of the invention may be diluted on-site to a desired final concentration prior to a use. In one embodiment the composition has a viscosity of 1000 to 12 000 mPas, or 2000 to 10 000 mPas, as measured at 25° C. using Brookfield LV-DV1 viscometer, equipped with a small sample adapter, and using spindle 31 and maximum rotation speed allowed by the equipment. In one embodiment the aqueous composition of dissolved starch has an initial viscosity of 2000 to 8000 mPas. Such a viscosity allows easy handling, but the water content of the composition is still low. A high dry matter content and a low water content allow lower transportation and storage volumes and enhance runnability of paper machine and drainage of the final product, such as a paper or board comprising the composition.

The viscosities of an aqueous composition of dissolved starch described here may be 3 000 to 6 000 mPas for a composition having 20 to 22 wt.-% of starch dry weight or 6 000 to 10 000 mPas for 22 to 25 wt.-% of starch dry matter and even up to 12 000 mPas for a composition having about 30 wt.-% of starch dry weight. The viscosity impacts on handling and e.g. pumpability of the composition.

The viscosity of the present composition has enhanced stability over a broad temperature range, which is especially beneficial for industrial products transported and stored in containers outdoors, and thus exposed to various temperatures, and even to vast temperature changes.

In one embodiment the starch (to be dissolved) is high amylopectin starch, preferably waxy starch. In one embodiment the starch is high amylopectin starch having at least 90% amylopectin. Amylopectin improves the stability of dissolved starch during storage and is advantageous in paper and board manufacturing application due to its high molecular mass.

In one embodiment the starch is degraded. Using the method here described it is possible to produce starch dissolutions with high starch content and without unnecessary water and thus easier drainage of a fibrous product comprising said composition.

In one embodiment the starch is cationic starch having a degree of substitution (DS, indicating the number of anionic/cationic groups in the starch on average per glucose unit) DS>0.01, DS>0.03, DS>0.045, such as 0.015 to 0.2, such as 0.045 to 0.15. Cationic starches can conveniently be used in paper and board manufacturing applications.

In one embodiment the aqueous starch slurry i.e. Feed-1 has starch content of 1-44 wt.-% starch, preferably 6 to 40 wt.-% starch (calculated as dry starch in said aqueous dispersion). In practise it is very difficult or impossible to produce a slurry of granular non-degraded starch with dry matter content above 44 wt.-% of starch dry matter. In another embodiment the aqueous starch slurry i.e. Feed-1 has starch content of up to 50 wt.-% starch.

High starch contents of a dissolved aqueous starch composition are beneficial especially when there is a need for transportation of the composition. In such cases the starch slurry used in method for producing such dissolved composition should also have a high starch dry matter content.

In such embodiments, the concentration of starch slurry to be gelatinized and dissolved (using a high shear dispergation) should also be as high as possible, such as 20 to 42 wt.-% or 30 to 40 wt.-%.

The starch content of a slurry may be lower for example in on-site production of dissolved starch compositions for wet-end use. In one embodiment the aqueous starch slurry used in on-site production i.e. Feed-1 has starch content of 1 to 40 wt.-%, 1 to 30 wt.-%, 18 to 40 wt.-%, 25 to 40 wt.-%, 2 to 20 wt.-% or 2.5 to 15 wt.-% starch (calculated as dry starch in said aqueous slurry).

If it is desired to dissolve additional polymers with the starch, it may necessary to reduce the starch dry matter in the slurry and thereby also in resulting dissolved starch composition. It is possible to add further components to dry starch, to starch slurry or to the dissolved starch. Possible additional components may be for example other polysaccharides, polyvinyl alcohol (PVA), vinyl polymers, stabilizing agents, polyethylene oxide (PEO), urea, stabilising agents, polyamines (as fixatives), pigments or biocides or any combination of those.

In one embodiment the dissolved starch composition derived from non-degraded starch comprises 1 to 30 wt.-% starch (dry weight). In one embodiment the dispersed starch composition comprises 6 to 28 wt.-% starch (dry weight). more preferably 12 to 27 wt.-%.

Using a mechanical dispergation it may be difficult to dissolve granular starch in low concentrations. The aqueous starch composition of the invention may be diluted on-site to a desired final concentration prior to use. When starch granules of low cationic starch (having a charge density 1.0 meq/g or less) are mixed in cold aqueous system optionally comprising additives or other polymers, the viscosity remains low and constant until the gelatinization temperature (on-set temperature for gelatinisation) of said starch is reached. The viscosity increases sharply when the gelatinisation of slurried starch starts at on-set temperature ($T_o$) of said starch type. Further increase of temperature (above $T_{peak}$) would lower the viscosity but also increase hydrolysis.

In one embodiment the temperature of the aqueous feed (feed-2) is sufficient to raise the temperature of the mixed feed (Feed-3) to or above the gelatinisation peak temperature ($T_{peak}$), of the starch of the feed of aqueous starch slurry (Feed-1), preferably above 75° C., more preferably above 80° C., still more preferably above ° C. and most preferably above 90° C.

Gelatinisation temperatures of starches are known within the field (Fredriksson et al. 1998 Carbohydrate polymers 35, 119-134) and can also be easily measured by a person skilled in the art. The ranges for starch gelatinization temperatures from about 62° C. to about 85° C. for waxy potato and from about 64° C. to about 95° C. for waxy maize. For pea the range is very broad, about 48 to 95° C.

The temperature of the aqueous feed (feed-2) is adapted to the gelatinisation temperature of the starch used in the method. The feed may be pressurized aqueous flow having a temperature of 100 to 140° C., such as 120° C. In some embodiment even superheated or saturated steam in even higher temperature may be used. Cavitation should be avoided in order to allow even flow and pumpability. Using high temperatures allows modifying the contact volumes of Feed-1 and Feed-2 and thereby maintaining the starch content as high as possible. The temperature of feed-2 may be 75 to 120° C.

The on-set temperature for gelatinisation may be 60 to 140° C.; 75 to 140° C.; 80 to 99° C. For example, dextrin starch will gelatinise already at about 60° C.

The temperature is dependent on starch type, as known within the field. In one embodiment the temperature of the mixed feed (Feed-3) is 75-100° C., preferably 85-94° C.

In embodiments were starch hydrolysis should be avoided, it is beneficial to maintain the temperature of the starch below 99° C. during essentially the whole processing time.

The contact ratios of aqueous feed (Feed-1) and aqueous starch slurry (Feed-2) may be between 1:1 to 1:50, such as 1:5 to 1:30 as measured in the total flow (liter per hour) of both feeds.

It is to be noted that in a special case where aqueous feed having an elevated temperature is a hot steam the ratio may be more than 1:1 as the aim is to gelatinize the starch dispersion without diluting the starch content. In one embodiment the time between bringing the feed of aqueous starch slurry (Feed-1) together with the aqueous feed (Feed-2) in step b) (residence time in conduit for mixed feed) to form a mixed feed (Feed-3) and subjecting said feed to dispergation is 0.2 to 60 seconds, preferably 0.5 to 40 seconds, more preferably 0.5 to 30 seconds, still more preferably 0.5 to 20 seconds, most preferably 1 to 15 seconds. In one embodiment the time between bringing the feed of aqueous starch slurry (Feed-1) together with the aqueous feed (Feed-2) in step b) to form a mixed feed (Feed-3) and subjecting said feed to dispergation is 0.5 to 20 seconds or 0.5 to 15 seconds or even 0.5 to 10 seconds. Mixed feed (Feed-3) is subjected to dispergation i.e. step c) after step b) without any intermediate further steps. Aim is to gelatinise the starch just before subjecting it to dissolution by dispergator but avoid using high temperatures or process time that could increase hydrolysis.

In one embodiment the dispergation, or other mixing, is performed using a circumferential speed of at least 25 m/s, preferably at least 40 m/s, more preferably at least 50 m/s measured at outer diameter of the rotor. In one embodiment the dispergation is performed using a circumferential speed between 25 to 120 m/s, preferably 40 to 100 m/s.

In one embodiment the dispergation or other mixing is performed using a power 10 to 150 kWh for 1 ton of mixed feed to be treated. In one embodiment 150 to 300 kWh per 1 ton, such as about 150 to 230 kWh per 1 ton on dry starch is used.

In one embodiment the dispergation or other mixing is performed using a blade speed of 800 to 13 000. In one embodiment the dispergation or other mixing is performed using a blade speed of 13 000 rpm or less, 10 000 rpm or less, 8 000 rpm or less, 6 000 rpm or less or 4 000 rpm or less. In one embodiment the dispergation or other mixing is performed using a blade speed of at least 1 000 rpm. In one embodiment the dispergation or other mixing is performed using a blade speed of 1 500 to 4 000 rpm. In one embodiment the dispergation or other mixing is performed using a blade speed of 2 500 to 8 000 rpm.

The mechanical force introduced to the gelatinised starch lowers the viscosity and increases water solubility of the starch. The force should be sufficient to dissolve the starch without causing remarkable degradation of molecular chains, or hydrolysis or extensive energy consumption. A person skilled in the art is able to optimize the parameters for each feed and equipment. Resulting homogenized aqueous dissolved starch composition has an improved texture and a soft structure.

Depending on the starch content of the aqueous slurry (Feed-1) it may be necessary to subject the dispersed feed (4) to two or more further dispergation steps. This may be arranged by circulating the feed directly back to the dispergator or first bringing it together with an aqueous feed (Feed-2) having a temperature of at least 60° C. and/or with of an aqueous starch slurry and then via a gelatinization zone to the dispergator. The higher dry matter (starch content) may require more intense or repeated dispergation. One advantage of the method described here is that the resulting composition is not subjected to a random hydrolysis and the share of oligomers in said composition is low.

Oligomers are not desirable in strength applications. In addition, oligomers are a carbons source for undesired microbial growth.

In one non-restricting full-scale production experiment for aqueous dissolved non-degraded high amylopectin starch composition having 24 wt.-% final starch content (starch dry matter) Cavitron having motor power of 70 kW was used as a dispergator. A feed of starch slurry and a feed of aqueous flow in an elevated temperature were brought together and subjected to a dispergation step as explained above. A feed of slurry was introduced to an aqueous feed having an elevated temperature in a perpendicular angle to ensure sufficient mass and heat transfer. A constant power out-put on average 65 kW was used for dispergation whereas revolution speed was 40 Hz at the beginning and then reduced to 35 Hz during increasing viscosity. Feeding rate at the beginning was 18 ton of mixed gelatinized feed per hour and reduced to 12.4 ton/hour during the process. Processing time was 8 hours. The composition was subjected to dispergation several times.

In one embodiment about 150 to 300 kWh per 1 ton, such as about 150 to 230 kWh per 1 ton on dry starch is needed to dissolve undegraded high amylopectin starch to a homogenous dissolved composition having 20 wt.-% to 26 wt.-% starch (dry matter)

Energy use about 65 kWh for 1 ton dry starch may be used for dissolving degraded starch or more dilute compositions which do not require repeated dispergation steps.

In one embodiment the feed (Feed-1) of an aqueous starch slurry is obtained from a slurry tank. In one embodiment the feed (Feed-1) of an aqueous starch slurry is formed by continuously slurrying starch granules with water. Any kind of flow mixing device can be used for continuous mixing and optionally when introducing starch granules to a dispersion tank.

In one embodiment the aqueous feed (Feed-2) is obtained from a dissolution tank having a temperature of 60 to 99° C. and wherein the mixed feed (Feed-3) after dispergation is circulated back to said tank. In such embodiment gelatinised or gelatinising heated aqueous starch feed circulates via a dissolution tank and a dispergation step. Said composition is enriched by starch slurry introduced to the circulation before each dispergation step.

Temperatures above 99° C. may result starch hydrolysis and boiling of the solution(s) and should be avoided.

An aqueous feed (Feed-2) starting from a heated dissolving tank is brought together with a slurry feed (Feed-1) to form a gelatinizing mixed feed (Feed-3) which is then subjected to a dispergation and returned to the dissolving tank. Mixing the slurry feed and the aqueous feed having an elevated temperature initiates the gelatinization of the starch granules, or even gelatinizes them, before the dispergation step. A dispergation treatment adjusts the viscosity of the gelatinized feed (Feed-3), which is then circulated back to the heated dissolution tank and can be used as aqueous feed (Feed-2) now having an elevated starch content and being further enriched by starch from feed-1. In other words, during the process there will be a circulating feed of at least partially gelatinized heated aqueous starch solution which is enriched by starch slurry feed (Feed-1) introduced to said circulation so that the slurried starch granules are at least partly gelatinized before the dispergation step.

This allows increasing the starch content of the resulting aqueous dissolved starch composition and maintaining the viscosity in level allowing pumping the composition with regular equipment. When the temperature of the overall process is maintained below 99° C. also the starch hydrolysis is minimized.

In one embodiment the mixed feed (feed-3) is circulated via the dispergator one or several times, for example 3 to 100 times, such as 15 times until the desired amount of starch slurry has been introduced. The circulation may be continued until essentially all starch has been dissolved. This allows also reducing the viscosity of the mixed gelatinised feed. As known within the field the peak viscosity of gelatinising starch is high and may cause pumpability problems in higher concentrations. This problem can be alleviated by repeated circulation steps and thereby decreasing viscosity.

It will be understood by a person skilled in the art that the number of times the mixed feed (Feed-3) is circulated is presented as a statistical average for the entire feed stock and does not imply that the entire volume of feed has been circulated precisely the number of times indicated. As a non-limiting example, it will be understood by a person skilled in the art that when the total volume of liquid in the system is 100 l, the mixed feed has been circulated five times when 500 l of liquid has passed the circulation pump.

In one embodiment the circulation of the dispersed mixed feed via dispergator is continued for example 1 to 4 hours after all the starch slurry has been introduced into said circulation (by bringing the slurry together with an aqueous feed having an elevated temperature).

The viscosity of the resulting dissolved aqueous starch solution is stable. The dissolved solution is also resistant to retrogradation.

In one embodiment a portion, such as 50 to 98 vol-%, of the dispersed mixed feed is lead back to the dispergator to further improve the dissolution and adjust the viscosity to 8 000 mPas or less. This can be repeated one or several times.

In one embodiment Feed-2 (aqueous feed, which will be enriched by starch during the process) is introduced to dispergation without bringing it together with starch slurry (feed-1). This may be repeated until the desired viscosity is reached.

In one embodiment the mixed feed (Feed-3) after dispergation is circulated back together with the feed (Feed-1) of an aqueous starch slurry before bringing said feed together with an aqueous feed (Feed-2) having a temperature of at least 60° C. to form a mixed feed (Feed-3).

In one embodiment the mixed feed (Feed-3) after dispergation is circulated back together with the feed (Feed-1) of an aqueous starch slurry without bringing said feed together with an aqueous feed (Feed-2) having a temperature of at least 60° C. to form a mixed feed (Feed-3).

A mixed feed (Feed-3) of at least partially gelatinized starch may be circulated (using pumps) at least 2 times via a dispergator. Starch slurry (Feed-1) and hot aqueous feed (Feed-2) are introduced to said circulation to elevate the starch content of the circulating feed and maintaining the temperature of the feed above gelatinization point characteristic to said starch type for sufficient time before entering the dispergator.

In one embodiment the mixed feed (Feed-3) of at least partially gelatinized starch is circulated (using pumps) at least 5 to 15 times via a dispergator without introducing starch slurry.

The technology described in here enables also continuous or batch cooking of starch with lower thermal energy consumption per ton of starch product compared to the conventional batch (pot) or jet-cooking processes. Thermal energy in the conventional processes is usually introduced using steam which furthermore forms condensate lowering solids content of the starch product.

Technology described here avoids lowering of the solids content via use of steam.

The Aqueous Dissolved Starch Compositions

The compositions obtained using the method described here typically have an enhanced viscosity stability over broad temperature range, which is especially beneficial for industrial products transported and stored in containers outdoors, and thus exposed to various temperatures, and even to vast temperature changes.

The compositions have enhanced stability against retrogradation, that is generally known to be enhanced at lower temperatures. This is an especially beneficial property for aqueous starch products containing or exposed to microbial contamination, including living microbes, spores and/or microbial enzymes, as the microbial spoilage may effectively be reduced or minimized at low temperatures. While biocides may be effective for killing of living or viable microorganisms, they may be ineffective e.g. against spoilage caused by residual microbial enzymes present in the product. Viscous products have an additional challenge as condensation water that is typically built in closed containers, may accumulate on top of the viscous product, and generate a layer that is prone to microbial growth, even when the viscous product itself contains a biocide. Additionally, some biocides may lose their biocidal power over time, and thereafter be inefficient e.g. against germination of spores. For some applications it may be desired or even required not to use biocides at all, or only to limited extent. As starch originates from natural sources, it is hardly available without some microbial contamination. For large volume industrial products complete sterilization and aseptic packaging is not a viable option. Due to the improved stability against retrogradation, the present compositions of dissolved starch may be subjected to lower temperatures, which provides a huge improvement to overall stability of the compositions, thereby overcoming many of the above challenges and limitations.

Compositions comprising starch with a high amylopectin content or waxy starch are beneficial for the viscosity stability of dissolved starch during a storage. Aqueous starch compositions having a high amylopectin starch content have an enhanced resistance to a retrogradation. Large molecular size improves starch retention to the fibrous material.

Non-degraded starch comprising also amylose (dissolved as described here) may be used in preparation of compositions for use in wet end applications as usually it does not require storage or transportation. Dry starch content of the composition may be 1-20 wt.-%, preferably 5-15% dry matter, or 1-10 wt.-% starch dry matter.

The compositions derived from non-degraded starch are beneficial in strength applications at the wet end applications of paper and board machines and have a good retention on fibre material. The low amount of oligomers is advantageous for retention and strength properties and also improves the microbial hygiene of the application.

Degraded starch compositions obtainable by the method described here can be used in surface size applications. The starch content may be for example 25-wt % of starch dry matter. For surface sizing for coating the starch content may be about 25 wt-%. Additional components may be as hydrophobic sizing agents, lignosulfonates, optical brighteners, synthetic polymers, colloidal silica, binders such as styrenebutadiene acrylate. Lower water content of the compositions allows using higher machine speeds in paper or board manufacturing.

The aqueous dissolved starch composition, especially aqueous solution of cationic starch, obtained by the present method may also be used for emulsifying and/or stabilizing hydrophobic internal sizing agents, such as alkenyl succinic anhydride (ASA), alkyl ketene dimer AKD, and rosin sizes, before being added to papermaking fibre stock for internal sizing.

In coating applications using degraded starch the coating composition may have dry matter content of up to 40 wt.-%, 50 wt.-%, 60 wt.-%, or even 70 wt.-% as coating pastes typically also contain other components, such as mineral pigments, binders, optical brighteners, rheology modifiers and possibly also biocides, dispersing agent, thickeners and/or colorants or any combination thereof. Low water content of the paste is advantageous. Starch compositions obtained by the methods described here may also be used in barrier coatings in for example food and/or liquid packaging materials. In addition to dissolved starch they may comprise binders and other conventional barrier compositions.

In one embodiment the composition prepared by the method described here further comprises up to 20 weight-% of one or more additives, such as preservatives, biocides, stabilizers, antioxidants, pH adjusting agents, buffers or the like. In another embodiment the aqueous composition of dissolved starch further comprises up to 15 wt.-%, or up to 10 wt-%, of one or more auxiliaries or additives, such as preservatives, biocides, stabilizers, antioxidants, pH adjusting agents, or the like. Examples of such auxiliaries or additives include polymers commonly used e.g. as stabilizers, including polyvinylalcohol (PVA), urea, polyethylene oxide (PEO). PVA may improve the stability of the viscosity, urea may be used to adjust the viscosity level. For example, about 15 wt.-% of dry matter of urea is effective in adjusting the viscosity and improving the stability of the aqueous composition. The aqueous starch composition may be used in sizing emulsions, such as ASA, AKD or rosin emulsions, as a protective colloid, emulsifier or stabilizing polymer, and/or for improving the retention of an internal sizing agent.

Typical composition prepared on-site has a final starch content of 9-39 wt.-%, 17-39%, 24-39%. Advantages of the composition are elevated dryness after surface sizing or coating, improved penetration of dispersed starch. A composition for wet end use may have starch content of 1-10 wt.-%, such as 1.3 to 7 wt.-%

Arrangement for Dissolving Starch.

The present invention relates also to an arrangement for dissolving starch. Said arrangement comprises
  conduit (8) for feeding an aqueous starch slurry (Feed-1) to conduit (10); and
  conduit (9) for feeding an aqueous feed having an elevated temperature (Feed-2) to conduit (10);
  conduit (10) for a mixed feed (Feed-3) formed by aqueous starch slurry (Feed-1) and aqueous feed having an elevated temperature (Feed-2) connecting conduits (8) for an aqueous starch slurry and conduit (9) for aqueous feed having an elevated temperature and high shear dispergator (11), and
  high shear dispergator (11) for reducing the viscosity of the gelatinized starch; and
  conduit (13) for circulating the dispersed feed back to the dispergator (11) or dissolution tank (20) or collecting the dispersed starch feed.

Conduit (8) and conduit (9) may be equipped with feed pumps. Conduit (10) is bringing together conduits (8) and (9) to form a mixed feed (Feed-3). The temperature of the mixed feed in conduit (10) initiates gelatinization of the starch in said feed (Feed-3). Conduit (10) leads the gelatinized/gelatinising mixed feed to dispergator (11). In one embodiment conduit (13) is arranged to lead the dispersed feed to the dissolution tank (20). From said dissolution tank the dissolution is formed to a new aqueous feed having an elevated temperature (Feed-2) and circulated back to the dispergator via conduit (9) and before dispergation brought together with a starch slurry flow in conduit (8) in order to further increase the starch content.

Conduits for slurry (8), aqueous feed having an elevated temperature (9) and for mixed feed (10) are arranged to ensure a sufficient mass and heat transfer. This may be done by controlling flow rates and bilateral assembly of the conduits. Also, a static mixing element or a dynamic mixer may be used. In another embodiment conduit (13) is arranged to circulate the dispersed feed back to the dispergator in order to adjust the viscosity.

Optionally conduit (9) for bringing aqueous flow having elevated temperature and/or conduit (8) for aqueous starch slurry are connected to said conduit (13). In such embodiment the starch dry matter content of the dissolved aqueous starch composition may be enriched, also without a separate dissolving tank.

In one embodiment conduit (13) is arranged to circulate the dispersed feed back to the dispergator and conduits (8), "conduit for slurry" and (9) "conduit for aqueous feed", in this order, are connected to said circulation with valves. In an arrangement where back circulation is arranged using conduits and without a dissolution tank, conduit (9) may be equipped with a heater, such as a steam heater or an electric heater for heating the aqueous feed and a valve for controlling introduction of the aqueous feed to conduit (10).

In still another embodiment conduit (13) is arranged to collect the dispersed aqueous starch composition. The feed can be collected for example for storage, transportation, or further formulation steps. Especially for on-site applications the dispersed feed can be led to another process, such as paper manufacturing.

In the embodiment where conduit (13) is arranged to collect the feed it may be equipped with a heat exchanger (cooling heat exchanger, 17) in order to reduce the temperature of the feed. This is beneficial as it reduces the formation of condensate water on surfaces of the storage tanks and also allows introduction of biocides or other temperature sensitive additives to said feed.

In one embodiment conduit (13) is equipped with inlets and conduits for introducing additives to the dispersed aqueous starch composition/dissolution. Said conduits may be equipped with pumps and/or valves.

The dispergator may be any mixing device suitable for introducing sufficient mechanical energy to the gelatinized starch. Device may be a rotor-stator or rotor-rotor type mixers, colloid mills or beads mills. Examples of commercial devices are Cavitron, Supraton and Atrex.

In one embodiment the high shear dispergator (11) has at least 25 m/s, preferably at least 40 m/s, more preferably at least 50 m/s circumferential speed measured at outer diameter of the rotor. In one embodiment the dispergator has less than 12 m/s, preferably less than 100 m/s circumvential speed measured at outer diameter of the rotor.

In one embodiment the dispergation or other mixing is performed using a power 10 to 150 kWh for 1 ton of mixed feed to be treated. In one embodiment 150 to 300 kWh per 1 ton, such as about 150 to 230 kWh per 1 ton on dry starch is used.

In one embodiment the dispergation or other mixing device in run using a blade speed of 800 to 13 000. In one embodiment the dispergation or other mixing device in run using a blade speed of 13 000 rpm or less, 10 000 rpm or less, 8 000 rpm or less, 6 000 rpm or less or 4 000 rpm or less. In one embodiment the dispergation or other mixing other mixing device in run using a blade speed of at least 1 000 rpm. In one embodiment the dispergation or other mixing device in run using a blade speed of 1 500 to 4 000 rpm. In one embodiment the dispergation or other mixing is performed using a blade speed of 2 500 to 8 000 rpm.

Aim of gelatinisation zone i.e. conduit (10) is to allow at least partial gelatinisation and then immediately lead the gelatinised solution to a dispergator. In one embodiment the length of the conduit (10) for a mixed feed, serving as so called gelatinisation zone, is adapted provide a sufficient gelatinization time for the starch in feed-3.

The length of conduit (10) for a mixed feed (gelatinisation conduit, for feed-3) is dependent on desired contact time of the aqueous starch slurry (feed-1) and aqueous heated feed (feed-2) before entry to the dispergator (as mixed feed-3). In one embodiment the desired contact time (and thus the length of conduit (10)) is sufficient to gelatinize starch and depends on at least temperatures of feed-1 and feed-2 in incoming conduits (8) and (9), contact ratios of said feeds and the gelatinization temperature of the starch to be gelatinised.

A person skilled in the art is able to adapt the geometry of the conduit to comply with desired gelatinization time. The mixed feed entering to the dispergator should be at least partially gelatinized. Significant parameters are at least the temperatures of feed-1 and feed-2 entering to the conduit (10), their volumes and flow rates, desired gelatinization temperature and stay time in the conduit and also geometry of said conduit (10). Use of an external heat source may allow faster flow (shorter conduit). The contact time can be prolonged by using a longer conduit and/or by introducing a widened section to the conduit and thereby lowering the flow rate. A long conduit and thereby prolonged contact time may increase a backpressure in the conduit.

In one embodiment the length of the conduit (10) for a mixed feed, serving as so called gelatinisation zone, is adapted to maintain the temperature of the mixed feed on or above the gelatinization temperature for of the starch to be dissolved gelatinised for 0.2 to 600 seconds or 0.2 to 120 seconds. In one embodiment the length of the conduit (10) for a mixed feed, serving as so called gelatinisation zone, is adapted to maintain the temperature of the mixed feed on or above the gelatinization temperature for of the starch to be dissolved gelatinised for 0.5 to 40 seconds, preferably 0.5 to 30 seconds, more preferably 0.5 to 20 sec, most preferably 1 to 15 seconds.

In one embodiment the arrangement further comprises
slurry tank (5) connected to conduit (8) for leading a starch slurry to the conduit (10) (conduit for a mixed feed); and
dissolving tank (20) connected to conduit (9) for leading aqueous feed to the conduit (10) for a mixed feed and conduit (4) for receiving dispersed mixed starch feed from the dispergator (11).

Means for mixing slurry tank (22) may be for example a simple rotatable propeller shaft with a plurality of propellers distributed along the length thereof. Means for heating, may be a jacket heater.

In one embodiment dissolving tank (20) is in contact with means for heating (21) said tank.

In one embodiment conduit for dispersed feed (4) is arranged to circulate the dispersed feed back to the high shear dispergator (11) and conduit for starch slurry (8) and conduit for aqueous feed (9), in this order, are connected to said circulation with valves.

In one embodiment the arrangement comprises
high shear dispergator (11) for reducing the viscosity of the gelatinized starch; and
conduit (8) for an aqueous starch slurry; and
conduit (23) for aqueous feed having an elevated temperature and
conduit (10) for a mixed feed connecting conduits (8) and (23) to the dispergator (11)
conduit (13) connected to the dispergator (11) for recovering the dispersed starch feed.

Figure 5:
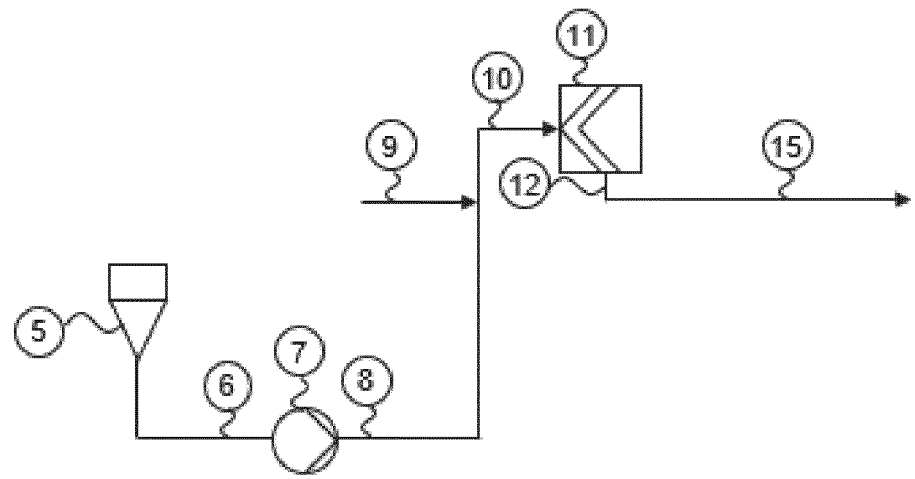
FIG. 5 is a schematic representation of a starch dispersing platform with single pass

This embodiment is illustrated in FIG. 5.

DESCRIPTION OF SOME EXEMPLARY EMBODIMENTS WITH REFERENCES TO DRAWINGS

List of Features Shown in Drawings

1. Dry starch storage
2. Dry starch feeding device
3. Starch inlet to slurry tank
4. Slurrying water
5. Slurry tank
6. Feed pump inlet
7. Slurry feed pump
8. Conduit for an aqueous starch slurry, "Slurry conduit"
9. Conduit for aqueous feed having an elevated temperature, "hot feed conduit"
10. conduit fora mixed feed, "gelatinization conduit/zone"
11. High shear dispergator
12. Dispergator outlet
13. Conduit for dispersed feed
14. Recirculation pump (optional)
15. Dissolved starch outlet
16. Heat exchanger for heating
17. Heat exchanger for cooling
18. Inlet for chemical(s) (optional)
19. Cooled starch dispersion outlet
20. Dissolving tank
21. Heating means for dissolving tank
22. Slurry tank mixer/agitator (optional)
23. Conduit for hot water or "hot water"

Reference is now made to FIG. 1 illustrating the principle of the method described here in form of a non-restrictive embodiment. Starch slurry (Feed-1) in conduit (8) and an aqueous feed having an elevated temperature (Feed-2) in conduit (9) are brought together to form a mixed feed (Feed-3) in conduit (10). Said conduits can be connected using e.g. Y-bar. Conduit (10) serves as so called gelatinisation conduit/zone. During a contact time between 0.2 to 60 seconds the temperature of the mixed feed is above the gelatinization point of the starch slurry resulting in gelatinization of at least part of the starch. Conduit (10) is connected to a high shear dispergator (5), which will adjust the viscosity of the mixed feed (Feed-3). The dispergator is connected to conduit (13) leading the dispersed feed (Feed-4) to further process steps or to storage.

Figure 2:
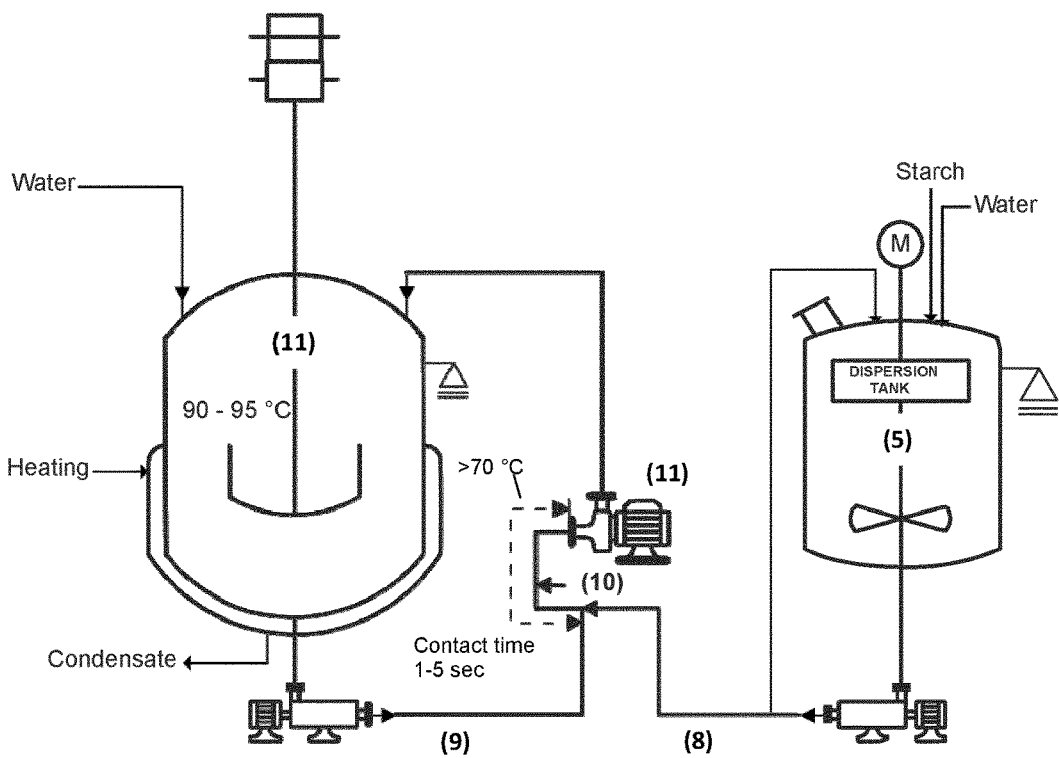
FIG. 2 is a schematic representation of a starch dispersing system with tank

FIG. 2 illustrates other non-restrictive embodiments of the invention. Water is fed into a dissolving tank (20) ("a reactor"). In an optional embodiment said dissolving tank (20) is equipped with means for heating or means for cooling or means for heating and cooling (21). In FIG. 2 a jacket for heating and cooling (21) is illustrated.

Conduit (9) for aqueous feed form the dissolving tank (20) leads to "Y-bar" (shown in FIG. 2) connecting conduit (9) and conduit (8) for slurry to form conduit (10) for mixed feed. Said conduit (10) leads to a high shear dispergator (5) and as conduit (13) back to the dissolving tank (20) thereby forming a circulation line. Conduit (9) for aqueous feed having an elevated temperature may be equipped with a circulation pump (14). So called "circulation line" equipped with a metal pipe which has a shape of letter "Y", and contains two inlets; for conduits (8) and (9) and one outlet for a mixed feed conduit (10). A high shear dispergator (11) is connected to the circulation line after Y-bar and between the mixed feed conduit (10) and conduit (13) for dispersed feed. Conduit 13 leads back to the dissolving tank (20) after dispergation-treatment. The conduits and the Y-bar may be insulated to avoid cooling of the material during circulation.

Dry starch is slurried in water in a slurry tank (5). Preferably said tank (5) is equipped with an agitator/mixer (22) to slurry the starch. Dry starch in powder or granular form from dry starch storage (1) is fed to the slurry tank (5) using a dry starch feeding device (2). Starch inlet is shown as (3). Water for slurrying the starch is introduced to tank (5) using conduit (4). Said slurrying water may be cold.

The slurry tank (5) is equipped with conduit (8) for slurry feed ("a transfer line") optionally equipped with a transfer pump (7) or "slurry pump". Said "slurry conduit" (8) is connected to ("hot water conduit") conduit (9) using Y-bar. It is to be noted that other type or assembly of connection may be beneficial for obtaining sufficient heat and mass transfer within the mixed feed. Starch slurry gets mixed with the aqueous feed from dissolution tank in Y-bar forming a mixed feed in conduit (10) for mixed feed. Conduit (10) may be called also a gelatinization conduit or gelatinization zone. Then the mixture enters high shear dispergator (11).

Water in the dissolving tank (20) is heated, for example using a jacket heater shown as (21). Dispergator frequency inverter(s) is (are) adjusted. Slurry pump (7) flow is adjusted and circulation pump (14) flow is adjusted to control the contact ratios of the slurry feed and aqueous feed. Starch is gelatinized when the starch slurry in conduit (8) contacts circulating aqueous flow having an elevated temperature in the Y-bar. Delay time of mixed feed in the conduit for a mixed feed (10) (so called "gelling conduit") may be 0.2 to 60 sec, typically 2 to 20 sec before the formed gel enters high shear dispergator (11).

Temperature of the gel (gelatinised mixed feed) is about 70 to 85° C., after dispergation-treatment.

Figure 3:
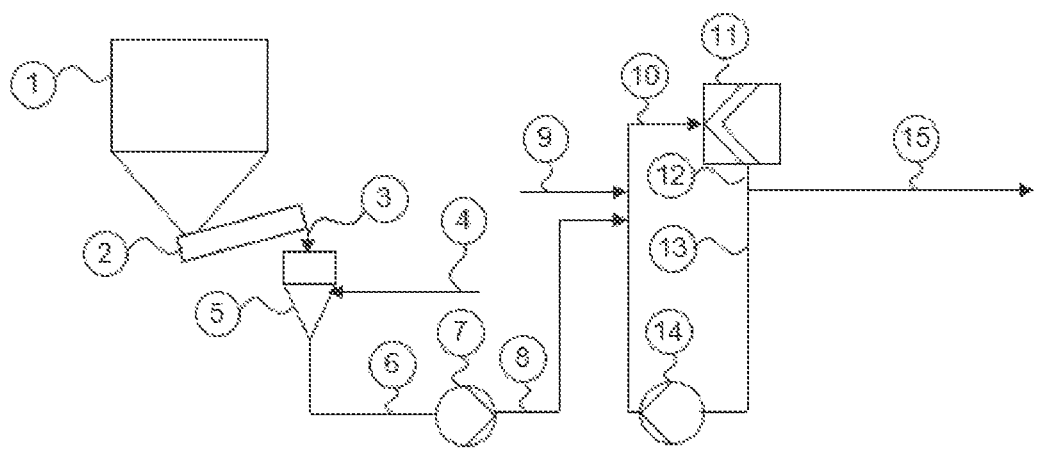
FIG. 3 is a schematic representation of a starch dispersing platform with circulation

In FIG. 3 starch dispersing platform with circulation is presented. In the beginning of the process starch is stored in dry starch storage (1). Dry starch storage (1) can be silo like that has narrowing bottom part which allows the emptying of storage. Dry starch has typically dryness of 80-90%. In some cases powder can be replaced with slurry that has dryness of 10-40%. Dry starch is transported from dry starch storage (1) with dry starch feeding device (2) through starch inlet to slurry tank (3). The dry starch feeding device (2) can be a screw. The volumetric flow of dry starch can be controlled e.g. by screw rotation speed. Slurrying water (cold dissolving water) (4) is added to make a slurry from dry starch in a slurry tank (5). Slurrying water (4) temperature is below the gelatination temperature of starch. Slurry is typically made to concentration below 40%. Slurry tank can be for example a cone or a tank. Typically, slurry should move in slurry tank (5) to avoid sedimentation of starch granules. From slurry tank (5) the slurry is moved to feed pump inlet (6). Feed pump (7) pumps slurry to conduit for an aqueous starch slurry, "Slurry conduit" (8). Feed pump (7) is preferably a screw pump also called as a mono pump. Flow rate in slurry conduit (8) is preferably adjusted with feed pump (7) to keep process stable. Hot water via conduit for aqueous feed having an elevated temperature, "hot feed conduit" (9) is mixed to slurry to start gelatination of starch in conduit for a mixed feed (10). Conduits (8) and (9) can be connected to conduit (10) also in other order, e.g. so that hot water is introduced first and then the slurry feed. The concentration in conduit for a mixed feed is preferably adjusted to <28% with hot water (23). Hot water (23) needs to be mixed properly to slurry, residence time in conduit for a mixed feed (10) has to be long enough and temperature high enough to facilitate gelling of starch before dispergator (11). Dispergator (11) generates high shear with rotating rotor and with counter plate, which is typically stator. Intensity in dispersing is high enough to allow starch to gradually dissolve and adjust its viscosity. Dispergator outlet (12) from the dispergator (11) is divided to flows to conduit for dispersed feed (13) and to dissolved starch outlet (15). Conduit for dispersed feed (13) leads back to the conduit for a mixed feed (10) through an optional re-circulation pump (14). The flow in conduit for dispersed feed (13) can be e.g. 5-25 times the flow of the slurry pipe (8). Higher the intensity and temperature increase in the dispergator the lower is the need for the recirculation flow.

Figure 4:
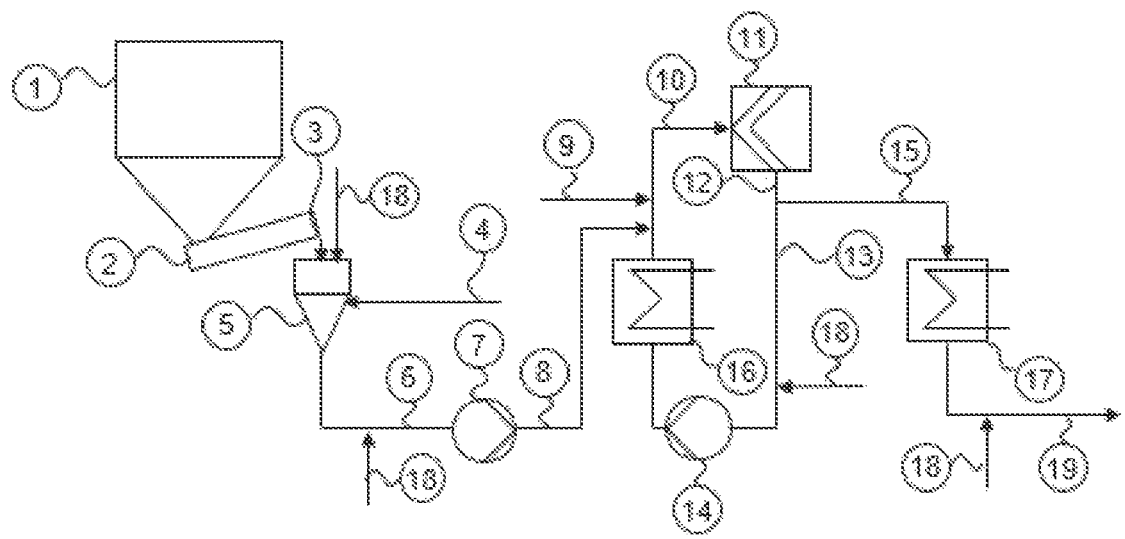
FIG. 4 is a schematic representation of a starch dispersing platform with circulation with heat exchange

In FIG. 4 starch dispersing platform with circulation with heat exchange is presented. In the beginning of the process starch is stored in dry starch storage (1). Dry starch storage (1) can be silo like that has narrowing bottom part which allows the emptying of storage. Dry starch has typically dryness of 80-90%. In some cases dry starch can be replaced with slurry that has dryness of 10-40%. Dry starch is transported from dry starch storage (1) with dry starch feeding device (2) through starch inlet to slurry tank (3). The dry starch feeding device (2) can be a screw. The volumetric flow of dry starch can be controlled e.g. by screw rotation speed. Slurrying water (4) is added to make a slurry from dry starch in a slurry tank (5). Slurrying water (4) temperature is below the gelatination temperature of starch. Slurry is typically made to concentration below 40%. Slurry tank can be for example a cone or a tank. Typically, slurry should move in slurry tank (5) to avoid sedimentation of starch granules. From slurry tank (5) the slurry is moved to feed pump inlet (6). Feed pump (7) pumps slurry to conduit for an aqueous starch slurry, "Slurry conduit" (8). Feed pump (7) is preferably a screw pump also called as mono pump. Flow rate in slurry conduit (8) is preferably adjusted with feed pump (7) to keep process stable. Hot water (23) is mixed to slurry to start gelatination of starch in conduit for a mixed feed (10). The concentration in conduit for a mixed feed is preferably adjusted to <28% with hot water (23). Hot water from "hot water conduit" (23) needs to be mixed properly to slurry, residence time in conduit for a mixed feed (10) has to be long enough and temperature high enough to facilitate gelling of starch before dispergator (11). Dispergator (11) generates high shear with rotating rotor and with counter plate, which is typically stator. Intensity in dispersing is high enough to allow starch to gradually dissolve and adjust its viscosity. Dispergator outlet (12) from the dispergator (11) is divided to flows to conduit for dispersed feed (13) and to dissolved starch outlet (15). Conduit for dispersed feed (13) leads back to the conduit for a mixed feed (10) through an optional re-circulation pump (14). The flow in conduit for dispersed feed (13) can be e.g. 5-25 times the flow of the slurry conduit (8). Higher the intensity and temperature increase in the dispergator the lower is the need for the recirculation flow. Dissolved starch outlet (15) is connected to cooling heat exchanger (17) which enables temperature to cool down e.g. below 60° C. to make optional chemical addition (18). Product is led to cooled starch outlet (19) and packed for transportation and/or let to a paper making process.

In FIG. 5 starch dispersing platform with single pass is presented. A slurry tank (5) contains dispersion comprising starch granules and water at temperature below the gelatination temperature of starch. Slurry is typically made to concentration below 40%. Slurry tank (5) can be for example a cone or a tank. Typically, slurry should move in slurry tank (5) to avoid sedimentation of starch granules. From slurry tank (5) the slurry is moved to feed pump inlet (6). Feed pump (7) pumps slurry to conduit for an aqueous starch slurry, "Slurry conduit" (8). Feed pump (7) is preferably a screw pump also called as mono pump. Flow rate in slurry conduit (8) is preferably adjusted with feed pump (7) to keep process stable. Hot water via hot water conduit (23) is mixed to slurry to start gelatination of starch in conduit for a mixed feed (10). The concentration in conduit for a mixed feed is preferably adjusted to <28% with hot water. Hot water (23) needs to be mixed properly to slurry, residence time in conduit for a mixed feed (10) has to be long enough and temperature high enough to facilitate gelling of starch before dispergator (11). Dispergator (11) generates high shear with rotating rotor and with counter plate, which is typically stator. Intensity in dispersing is high enough to allow starch to gradually dissolve and adjust its viscosity. Dispergator outlet (12) from the dispergator (11) leads dissolved starch to dissolved starch outlet (15).

Figure 6:
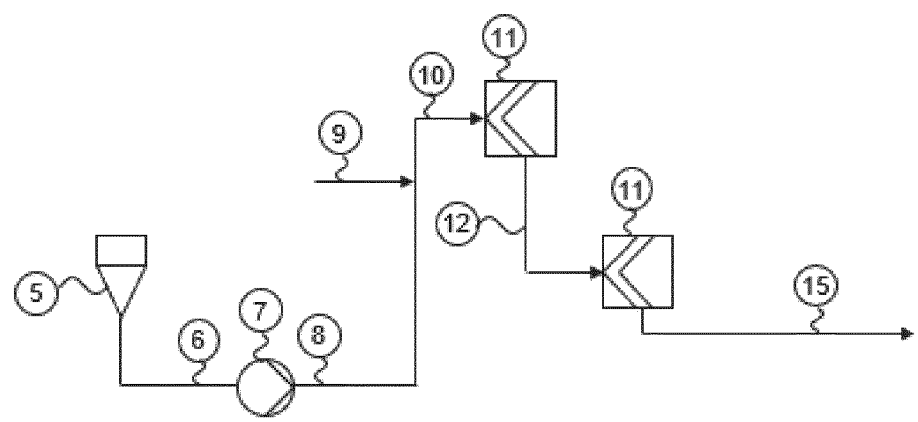
FIG. 6 is a schematic representation of a starch dispersing platform with serial connection

In FIG. 6 starch dispersing platform with serial connection is presented. A slurry tank (5) contains dispersion comprising starch granules and water at temperature below the gelatination temperature of starch. Slurry is typically made to concentration below 40%. Slurry tank (5) can be for example a cone or a tank. Typically, slurry should move in slurry tank (5) to avoid sedimentation of starch granules. From slurry tank (5) the slurry is moved to feed pump inlet (6). Feed pump (7) pumps slurry to conduit for an aqueous starch slurry, "Slurry conduit" (8). Feed pump (7) is preferably a screw pump also called as mono pump. Flow rate in slurry (8) is preferably adjusted with feed pump (7) to keep process stable. Hot water from hot water conduit (23) is mixed to slurry to start gelatination of starch in conduit for a mixed feed (10). The concentration in conduit for a mixed feed is preferably adjusted to <28% with hot water (23). Hot water (23) needs to be mixed properly to slurry, residence time in conduit for a mixed feed (10) has to be long enough and temperature high enough to facilitate gelling of starch before dispergator (11). Dispergator (11) generates high shear with rotating rotor and with counter plate, which is typically stator. Intensity in dispersing is high enough to allow starch to gradually dissolve and adjust its viscosity. Dispergator outlet (12) from the first dispergator (11) is connected to second dispergator (11). There can be more dispergators connected in series. Pipe from last dispergator is connected to dissolved starch outlet (15).

Figure 7:
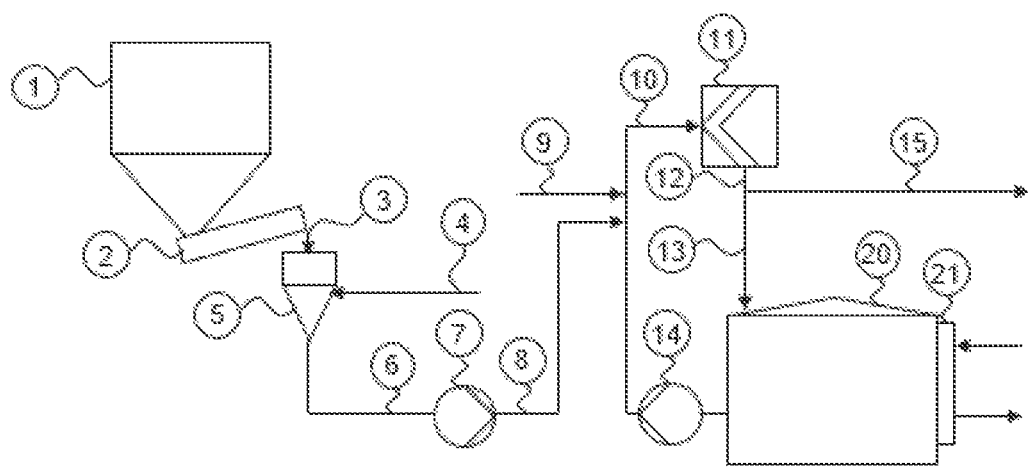
FIG. 7 is a schematic representation of a starch dispersing system with tank

FIG. 7 shows an embodiment with starch dispersing system with tank. In the beginning of the process starch is stored in dry starch storage (1). Dry starch storage (1) can be silo like that has narrowing bottom part which allows the emptying of storage. Starch powder has typically dryness of 80-90%. In some cases powder can be replaced with slurry that has dryness of 10-40%. Powder is transported from dry starch storage (1) with dry starch feeding device (2) through starch inlet to slurry tank (3). The dry starch feeding device (2) may be a screw. The volumetric flow of dry starch can be controlled e.g. by screw rotation speed. Slurrying water (cold dissolving water) (4) is added to make a slurry from dry starch in a slurry tank (5). Slurrying water (4) temperature is below the gelatination temperature of starch. Slurry is typically made to concentration below 40%. Slurry tank can be for example a cone or a tank. Typically, slurry should move in slurry tank (5) to avoid sedimentation of starch granules. From slurry tank (5) the slurry is moved to feed pump inlet (6). Slurry feed pump (7) pumps slurry to conduit for an aqueous starch slurry, "Slurry conduit" (8). Feed pump (7) is preferably a screw pump also called as mono pump. Flow rate in slurry pipe (8) is preferably adjusted with feed pump (7) to keep process stable. Hot water (23) is mixed to slurry to start gelatination of starch in conduit for a mixed feed, "gelatinization conduit/zone" or "gelling pipe" (10). The concentration in conduit for a mixed feed is preferably adjusted to <28% with hot water (23). Hot water (9) needs to be mixed properly to slurry, residence time in conduit for a mixed feed (10) has to be long enough and temperature high enough to facilitate gelling of starch before dispergator (11). High shear dispergator (11) generates high shear with rotating rotor and with counter plate, which is typically stator. Intensity in dispersing is high enough to allow starch to gradually dissolve and adjust its viscosity. Dispergator outlet (12) from the dispergator (11) is divided to flows to conduit for dispersed feed (13) and to dissolved starch outlet (15). Conduit for dispersed feed (13) leads to the dissolving tank (20). For elevating the starch temperature close to gelatination temperature, line is equipped with means for dissolving tank heating (21). Recirculated starch is pumped from Dissolving tank (20) by re-circulation pump (14). The flow in conduit for dispersed feed (13) can be e.g. 5 to 25 times the flow of the slurry conduit (8). Higher the intensity and temperature increase in the dispergator the lower is the need for the recirculation flow.

EXAMPLES

Example 1: Method for Dissolving Cationic Waxy Starch with Recirculation 264 kg tap water was fed into a 800 liter tank, "dissolving tank", was equipped with a jacket for heating and cooling, and a circulation line form the bottom of the reactor and back to the top of the dissolving tank. The circulation line was equipped with a circulation pump (Mohno pump-type) to circulate the liquid in the reactor through the circulation line, "circulation pump". The circulation line was equipped also with a metal pipe which has a shape of letter "Y", and contains two inlets and one outlet, "Y-bar". The circulation line was connected to the in-let 1 of the Y-bar. Diameter of Y-bar was 5 cm and length 120 cm. Atrex CD550 G30 rotor-rotor dispergator was connected to the circulation line after Y-bar and liquid goes back to the reactor after Atrex-treatment. The lines and the Y-Bar were insulated to avoid cooling of the material during circulation.

150 kg cationic waxy potato starch (DS 0.07, CD 0.4 meq/g measured at pH 7, dry content 82 wt.-%, pH of 35 wt.-% slurry 7.5, dry starch 123 kg) was slurried in 201 kg water in a 800 liter slurry tank equipped with an agitator to get a starch slurry of 35 wt.-%. Agitator speed was about 60 rpm during slurrying stage. The slurry tank was equipped with a transfer line which contain a transfer pump (Mohno type pump), "slurry pump". The line was connected to the inlet 2 of the Y-bar. Starch slurry gets mixed with the reactor liquid in Y-bar and then the mixture enters Atrex dispergator.

Water in the reactor was heated to 87° C. with a jacket. Circulation pump flow was adjusted with water to 8.6 kg/min. Atrex frequency inverter 1 and 2 were both adjusted to 50 Hz resulting blade speed of 1000 rpm. Slurry pump flow was adjusted to 1.8 kg/min. Starch was gelatinized when the starch slurry contacts circulation liquid in the Y-bar. Delay time of the gel was about 14 sec before the formed gel enters Atrex. Temperature of the gel was about 77-80° C., after Atrex-treatment.

After 60 min processing Atrex frequency inverters were increased to 67 Hz resulting blade speed of 1340 rpm. When all of the starch slurry was pumped into Y-bar, heating of the reactor was stopped. The liquid in the reactor was circulated for 30 min with 70 Hz frequency of both inverters which was equal to blade speed of 1400 rpm. The dissolved starch composition was cooled to 25° C. with a jacket. Reactor and slurry tank were not pressurized vessels and they didn't contain condenser and thus a part of the water was evaporating during the dissolving process.

The composition was cooled with a jacket. The composition contains the following characteristics: Dry solids (starch content) 22.2 wt.-%, Viscosity 6300 mPas at 25° C., pH 7.8.

Example 2: Dissolving of Cationic Waxy Starch by Dispersive Dissolving Method 179 kg tap water was fed into a 800 liter reactor (or "dissolving tank") (T241), which was equipped with similar equipment as in the example 1, but heating of the reactor was with direct steam by pipe and not with a jacket. The high shear dispergator which was installed after the "Y-bar", was Cavitron rotor stator dispergator.

A starch slurry of 35 wt-% was made by mixing 175 kg cationic waxy starch (cationic waxy potato starch, DS 0.07, CD 0.4 meq/g, dry content 82%, pH of 35% slurry 7.5, dry starch 144 kg) in 235 kg water in a 800 liter slurry tank (T247), which was similar and equipped with similar equipment than in the example 1. The transfer line from the slurry tank was connected to the inlet 2 of the Y-bar, which was connected to Cavitron high shear dispergator.

Slurry pump flow was adjusted with water to 3.4 kg/min. Circulation pump flow was adjusted with water to 8.5 kg/min. Delay time of the combined mixture was about 13 sec before the mixture enters Cavitron. Water in the reactor was heated with direct steam to 88° C. and a small flow was left on. Circulation pump was turned on and Cavitron was turned on. Frequency of the inverter of Cavitron was adjusted to 40 Hz. Slurry pump was turned on and process time was started. Pressure of Cavitron was monitored, the value was varying between 0.9-1.0 bar indicating of stable dispersion process, and no fluctuation due to blockage etc. was not detected. Samples were taken from the outlet of Cavitron and from the reactor for analysis Scale values of both the reactor and slurry tank were monitored. Temperature of the reactor was monitored. Material amounts and temperatures of the reactor are shown in the table 1. Analysis values of Cavitron outlet samples are shown in the table 2. Analysis values of the reactor sample are shown in the table 3.

When all of the starch slurry was pumped into circulation line, then heating with direct steam was stopped and circulation was continued for 1.5 h. A sample of the final product was taken and cooled to 25° C. Dry content was 20.7%, viscosity 3100 mPas and pH 7.1. Cationic undegraded starch can be dissolved to concentrated solution by dispersion dissolving technique.

TABLE 1

Material amounts and temperatures of the reactor during starch dissolving process.

| Process time (min) | Slurry tank, scale value (kg) | Dosed slurry (kg) | Reactor, scale value (kg) | Total slurry tank and reactor scale value (kg) | Temperature Reactor (° C.) | Samples Type |
|---|---|---|---|---|---|---|
| 0 | 410 | 0 | 180 | 590 | 87.5 | |
| 10 | 383 | 27 | 204 | 587 | 88.5 | Cavitron outlet |
| 15 | 365 | 45 | 224 | 589 | 87.5 | |
| 18 | 352 | 58 | 238 | 590 | 87.6 | Reactor |
| 21 | 341 | 69 | 249 | 590 | 87.4 | |
| 26 | 324 | 86 | 268 | 592 | 87.6 | |
| 31 | 310 | 100 | 285 | 595 | 88.0 | Cavitron outlet |
| 36 | 293 | 117 | 308 | 601 | 88.5 | Reactor |
| 41 | 276 | 134 | 323 | 599 | 89.2 | |
| 46 | 258 | 152 | 349 | 607 | 89.6 | Cavitron outlet |
| 51 | 242 | 168 | 362 | 604 | 89.9 | Reactor |
| 56 | 225 | 185 | 379 | 604 | 90.4 | |
| 61 | 204 | 206 | 403 | 607 | 91.0 | Cavitron outlet |
| 66 | 191 | 219 | 416 | 607 | 91.2 | |
| 68 | 181 | 229 | 429 | 610 | 91.5 | |
| 70 | 176 | 234 | 421 | 597 | 91.5 | Reactor |
| 71 | 182 | 228 | 436 | 618 | 91.7 | |
| 79 | 157 | 253 | 463 | 620 | 91.9 | Cavitron outlet |
| 86 | 135 | 275 | 492 | 627 | 92.2 | Reactor |

TABLE 1-continued

Material amounts and temperatures of the reactor during starch dissolving process.

| Process time (min) | Slurry tank, scale value (kg) | Dosed slurry (kg) | Reactor, scale value (kg) | Total slurry tank and reactor scale value (kg) | Temperature Reactor (° C.) | Samples Type |
|---|---|---|---|---|---|---|
| 93 | 110 | 300 | 512 | 622 | 92.6 | |
| 95 | 102 | 308 | 523 | 625 | 92.7 | Cavitron outlet |
| 104 | 73 | 337 | 553 | 626 | 92.7 | |
| 112 | 47 | 363 | 578 | 625 | 92.7 | |
| 121 | 19 | 391 | 610 | 629 | 92.8 | |
| 128 | 0 | 410 | 630 | 630 | 92.9 | |

TABLE 2

Analysis values of Cavitron outlet samples. Samples after Cavitron outlet

| Process time (min) | Temp, measured (° C.) | Viscosity at temp measured (mPas) | Dry solids (%) | Viscosity, 25° C. (mPas) | Temp reactor (° C.) |
|---|---|---|---|---|---|
| 10 | 73.8 | 940 | 13.2 | 2440 | 88.5 |
| 31 | 75.6 | 1900 | 18.1 | 5900 | 88.0 |
| 46 | 78.0 | 1990 | 20.4 | 7600 | 89.6 |
| 61 | 78.0 | 2160 | 22.1 | 9900 | 90.4 |
| 79 | 78.5 | 2700 | 23.2 | 9800 | 91.9 |
| 95 | 79.2 | 2900 | 24.1 | 9400 | 92.7 |

TABLE 3

Analysis values of the reactor sample. Samples from the reactor (dissolving tank)

| Process time (min) | Temp, measured (° C.) | Viscosity at temp measured (mPas) | Dry solids (%) | Viscosity, 25° C. (mPas) | Temp, reactor (° C.) |
|---|---|---|---|---|---|
| 18 | 87.1 | 240 | 8.0 | 720 | 87.6 |
| 36 | 88.0 | 580 | 12.6 | 2700 | 88.5 |
| 51 | 89.6 | 750 | 16.3 | 5000 | 89.9 |
| 70 | 89.9 | 705 | 18.3 | 5100 | 91.5 |
| 86 | 91.6 | 800 | 20.1 | 5700 | 92.2 |

Example 3: One Pass Test of Gelatinized Starch Through Cavitron

In order to check the impact of one pass of Cavitron treatment, a similar process as in example 2 was made. After 90 min form the start of starch slurry dosing to Y-bar, the Y-bar was removed from Cavitron inlet and about 15 kg material from Y-bar was collected to an insulated bucket. The material was viscous gel type well flowing material at temperature of 70° C. The product was pumped through Cavitron, model CD1010 with different flow. Cavitron frequency of Cavitron was adjusted to first 40 Hz and then 36 Hz. Temperature of the out coming product was detected. Viscosity and dry content were determined from cooled material. Results of the one pass test are shown in the table 4.

TABLE 4

Results of the one pass test of Cavitron Samples of one pass test of Cavitron

| Sample No. | Frequency of dosing pump (Hz) | Flow to Cavitron (kg/min) | Temp after Cavitron treatment (° C.) | Viscosity 25° C. (mPas) | Dry solids (%) |
|---|---|---|---|---|---|
| 1 | start material | — | — | 48 000 | 23.7 |
| 2 | 20 | 1.45 | 89 | 4 300 | 24.0 |
| 3 | 40 | 2.90 | 85 | 4 600 | 23.9 |
| 4 | 50 | 3.60 | 82 | 4 500 | 24.1 |

Results show that viscosity of Cavitron treated product reduced significantly compared to the start material. Changing of flow from 1.45 kg/min to 3.60 kg/min had little impact on the quality of the treated starch solution. Temperature of the treated material was higher with smaller flow rate, which indicated on longer delay time at the rotor stator chamber.

The invention claimed is:

1. A method for dissolving starch, the method comprising:
    a) providing a feed (Feed-1) of an aqueous starch slurry having a temperature at least 5° C. below gelatinization temperature (on-set) of the starch;
    b) bringing said feed (Feed-1) together with an aqueous feed of starch (Feed-2) having a temperature of at least 60° C. to form a mixed feed (Feed-3); and
    c) subjecting said mixed feed (Feed-3) to dispergation to adjust the viscosity of said mixed feed (Feed-3).
2. The method of claim 1, wherein the temperature of the aqueous starch slurry of Feed-1 is less than 45° C.
3. The method of claim 1, wherein the aqueous starch slurry of Feed-1 has a starch content of 1-44 wt. % starch, calculated as dry starch in said aqueous starch slurry.
4. The method of claim 3, wherein the aqueous starch slurry of Feed-1 has a starch content of 6 to 40 wt.-% starch, calculated as dry starch in said aqueous slurry.
5. The method of claim 1, wherein the temperature of the aqueous feed of starch (Feed-2) is sufficient to raise the temperature of the mixed feed (Feed-3) above the gelatinization temperature of the starch of the feed of the aqueous starch slurry (Feed-1).
6. The method of claim 5, wherein the temperature of the aqueous feed of starch (Feed-2) is sufficient to raise the temperature of the mixed feed (Feed-3) above 75° C.
7. The method of claim 1, wherein a time between bringing the feed of the aqueous starch slurry (Feed-1) together with the aqueous feed of starch (Feed-2) in step b) and subjecting said mixed feed (Feed-3) to dispergation is in a range of 0.2 to 60 seconds.

8. The method of claim 7, wherein the time between bringing the feed of the aqueous starch slurry (Feed-1) together with the aqueous feed of starch (Feed-2) in step b) and subjecting said mixed feed to dispergation is in a range of 1-20 seconds.

9. The method of claim 1, wherein dispergation is performed using circumferential speed of at least 25 m/s.

10. The method of claim 9, wherein dispergation is performed using circumferential speed of at least 50 m/s.

11. The method of claim 1, wherein the feed (Feed-1) of an aqueous starch slurry is obtained from a tank or formed by continuously dispersing starch granules with water.

12. The method of claim 1, wherein starch is non-degraded starch.

13. The method of claim 1, wherein the aqueous feed of starch (Feed-2) is obtained from a tank having a temperature in a range of 60 to 99° C., and wherein the mixed feed (Feed-3) after dispergation is circulated back to said tank.

14. The method of claim 1, wherein the mixed feed (Feed-3) after dispergation is circulated back together with the feed (Feed-1) of an aqueous starch slurry before bringing said feed (Feed-1) together with an aqueous feed of starch (Feed-2) having a temperature of at least 60° C. to form a mixed feed (Feed-3).

15. The method of claim 1, wherein starch in the mixed feed (Feed-3) in step c) is partially dissolved.

16. The method of claim 1, wherein in step a) the feed (Feed-1) of the aqueous starch slurry has a temperature at least 10° C. below gelatinization temperature (on-set) of the starch.

17. An arrangement for dissolving starch comprising
a conduit for feeding an aqueous starch slurry (Feed-1) to a conduit for mixed feed;
a conduit for feeding an aqueous feed of starch having an elevated temperature (Feed-2) to the conduit for mixed feed;
the conduit for mixed feed connecting the conduit for aqueous starch slurry (Feed-1), the conduit for aqueous feed of starch (Feed-2) to form a mixed feed and further connecting a high shear dispergator,
the high shear dispergator for adjusting a viscosity of gelatinized starch in the mixed feed; and
a conduit for circulating dispersed starch feed back to the dispergator or a dissolution tank or recovering the dispersed starch feed,
wherein the conduit for the mixed feed is configured to serve as a gelatinization zone by having a length adapted to provide a sufficient gelatinization time for the starch in mixed feed (feed-3), and lead for resulting gelatinized solution to the dispergator.

18. The arrangement of claim 17, wherein the high shear dispergator has at least 25 m/s circumferential speed.

19. The arrangement of claim 17 further comprising
a slurry tank connected to the conduit for feeding an aqueous starch slurry (Feed-1) to the conduit for mixed feed;
a dissolving tank connected to the conduit for feeding an aqueous feed of starch (Feed-2) to the conduit for mixed feed (Feed-3); and
the conduit for receiving dispersed mixed starch feed from the dispergator.

20. The arrangement of claim 17, wherein the conduit for dispersed feed is arranged to circulate the dispersed feed back to the high shear dispergator and the conduit for feeding the aqueous starch slurry (Feed-1) and the conduit for feeding the aqueous feed of starch (Feed-2) are connected to said circulation with valves.

* * * * *